P-OXYBENZOYL COPOLYESTERS
Filed May 28, 1969
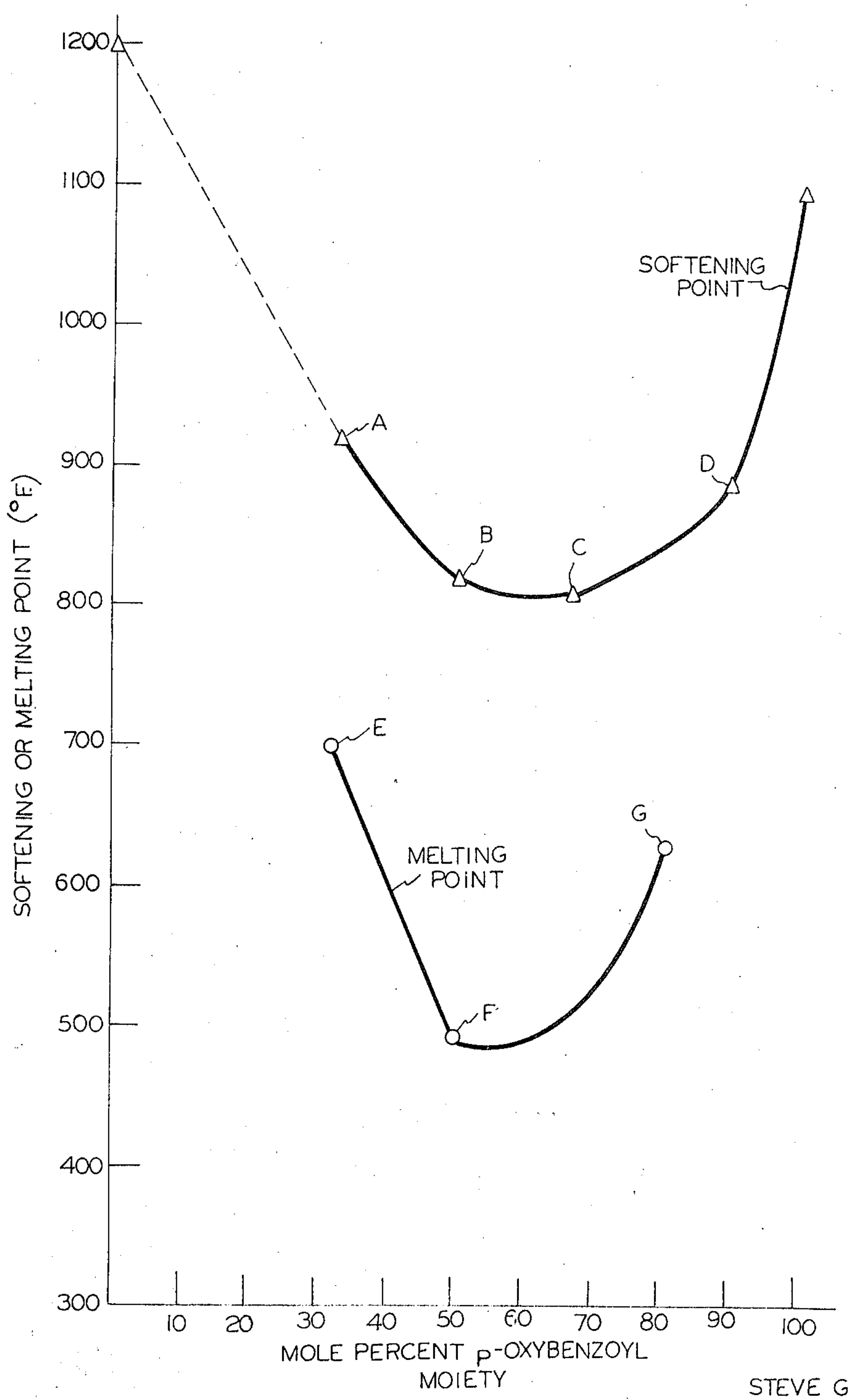
INVENTORS
STEVE GUST COTTIS
JAMES ECONOMY
BERNARD EDWARD NOWAK
BY
ATTORNEY United States Patent Office 3,637,595

Patented Jan. 25, 1972

3,637,595

P-OXYBENZOYL COPOLYESTERS

Steve G. Cottis, 85 Niagara Falls Blvd. 14214; James Economy, 465 Ruskin Road 14226, both of Buffalo, N.Y.; and Bernard E. Nowak, 148 Seneca Place, Lancaster, N.Y. 14086

Filed May 28, 1969, Ser. No. 828,484
Int. Cl. C08g *17/02, 17/08*
U.S. Cl. 260—47 C 13 Claims

ABSTRACT OF THE DISCLOSURE

A polyester of recurring moieties of Formulae I, II and III:

(I)

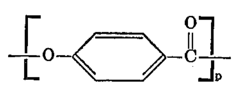

(II)

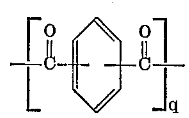

(III)

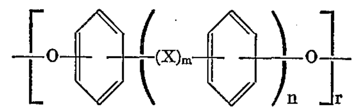

wherein X is —O— or —$SO_2$—; $m$ is 0 or 1; $n$ is 0 or 1; and $p$, $q$ and $r$ are preferably present in certain defined ratios.

p-Oxybenzoyl homopolyesters are well known in the art but have heretofore found little commercial application due to their low molecular weight and their tendency to thermally degrade rather than melt. The inability to melt these polyesters precludes the use of conventional forming techniques such as casting, injection molding or extrusion. Furthermore, it has heretofore been difficult or impossible to coat substrates with these polyesters or to draw them into fibres. The synthesis of such oxybenzoyl polyesters is described in Aelony et al. U.S. Pat. 2,728,-747; Caldwell U.S. Pat. 2,600,376 and Gilkey et al. "Polyesters of Hydroxybenzoic Acids," J. of Applied Polymer Sci., vol. II, issue No. 5, pp. 198–202 (1959).

Accordingly, it is an object of the present invention to provide novel polyesters containing p-oxybenzoyl moieties which are substantially free of the disadvantages of similar prior polyesters.

Another object is to provide novel polyesters having a p-oxybenzoyl moiety.

A further object is to provide polyesters having a p-oxybenzoyl moiety which do not melt but which have a softening point of from 750 to 1100° F.

A further object is to provide polyesters having a p-oxybenzoyl moiety which are heat resistant but have a melting point within the range of 400° F. to 800° F.

A still further object is to provide a novel process for producing polyesters having a p-oxybenzoyl moiety.

Yet another object is to provide a novel polyester having a p-oxybenzoyl moiety which can be formed by the use of conventional techniques.

Yet another object is to provide a novel coated substrate.

Yet another object is to provide a novel fiber.

Additional objects and advantages of the present invention will be apparent to those skilled in the art by reference to the following detailed description thereof.

According to the present invention there is provided a polyester of recurring moieties of Formulae I, II and III:

(I)

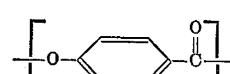

(II)

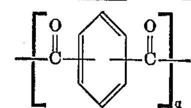

(III)

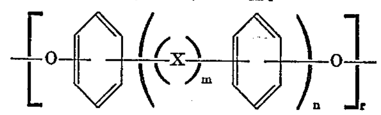

Wherein X is —O— or —$SO_2$—; $m$ is 0 or 1; $n$ is 0 or 1; $q:r=10.15$ to $15:10$; $p:q=1:100$ to $100:1$; $p+q+r=3$ to 600 and preferably 30 to 200. The carbonyl groups of the moiety of Formula I or II are linked to the oxy groups of a moiety of Formula I or III; the oxy groups of the moiety of Formula I or III are linked to the carbonyl groups of the moiety of Formula I or II.

According to the present invention it has been shown that the above polyesters exhibit softening or melting points which are lower than either the p-oxybenzoyl homopolyesters or the polyester consisting essentially of the moieties of Formulae II and III.

In the above described polyesters the carbonyl groups of the moiety of Formula II are either para or meta to each other but are preferably para. Likewise the oxy groups of the moiety of Formula III are either para or meta but are preferably para. When $n$ is equal to 1 in Formula III "para" refers to the 4,4′-positions and "meta" to the 3,4′- or 3,3′-positions. In a preferred embodiment of the present invention wherein $n$ is equal to 0 in Formula III and both the carbonyl groups and the oxy groups are para to each other the polyester comprises one of recurring moieties of Formula I above and Formulae IV and V:

(IV)

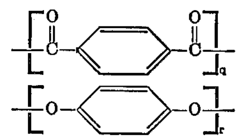

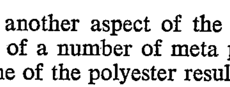

(V)

According to another aspect of the present invention, the introduction of a number of meta phenylene radicals into the backbone of the polyester results in a copolyester having a lower softening or melting point. In general the ratio of meta phenylene radicals to para phenylene radicals is greater than 1:10 and is preferably 1:10 to 10:1.

The reactants which supply the moieties of Formulae I, II and III can be employed in widely varying ratios. However, in order to achieve high molecular weight the molar ratios of these reactants must be carefully controlled and therefore the molar ratio of the dicarbonyl compound having the moiety of Formula II to the dioxy compound having the moiety of Formula III is maintained between 10:15 and 15:10 and preferably 10:11 and 11:10 and ideally 10:10. The reactant which introduces the p-oxybenzoyl moiety of Formula I can be present in widely varying molar ratios but is generally present in molar ratios of 1:100 to 100:1 and preferably 10:100 to 100:10 moles of reactant having the moiety of Formula I per mole of reactant having the moiety of Formula II.

The polyesters of the present invention can have widely varying molecular weights from 500 to over 72,000 but are generally between 3,500 and 25,000. Therefore the sum of $p$, $q$ and $r$ is generally 3 to 600 and more usually 30 to 200.

The polyesters of the present invention can be random, block or highly ordered copolymers and can be synthesized by a wide variety of processes. In general those prior processes useful for synthesizing high molecular weight p-oxybenzoyl homopolyesters can be employed to produce the copolyesters of the present invention. In general a p-oxybenzoyl compound of Formula VI is reacted with a dicarbonyl compound of Formula VII and the dioxy compound of Formula VIII to produce a polyester of Formula IX according to Equation 1:

(Equation 1)

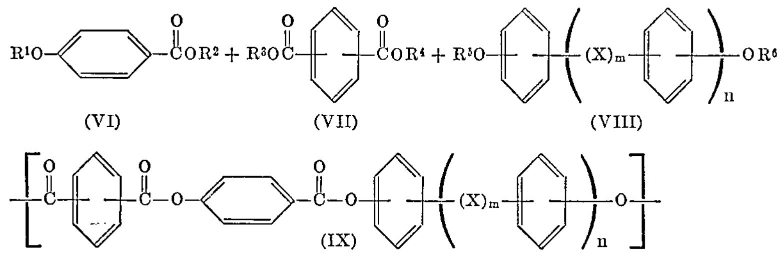

Wherein *m*, *n* and X have the above described meanings; $R^1$, $R^5$ and $R^6$ are benzoyl, lower alkanoyl or preferably hydrogen; and $R^2$, $R^3$ and $R^4$ are hydrogen, benzyl, lower alkyl or preferably phenyl.

The compounds of Formulae VI, VII and VIII can be simultaneously charged to a reaction zone. Alternatively the compound of Formula VI can be reacted with the compound of Formula VIII and this reaction product further reacted with the compound of Formula VII. However, the compound of Formula VI is preferably first reacted with the compound of Formula VII and this reaction product further reacted with the compound of Formula VIII. By this procedure polyesters having regularly recurring structural units are produced.

Examples of suitable compounds of Formula VI include among others p-hydroxybenzoic acid, phenyl-p-hydroxybenzoate, p-acetoxybenzoic acid; and isobutyl-p-acetoxybenzoate. Examples of suitable compounds of Formula VII include among others isophthalic acid, terephthalic acid, diphenyl terephthalate, diethyl isophthalate; methylethyl terephthalate, and the isobutyl half ester of terephthalic acid. Examples of suitable compounds of Formula VII include among others hydroquinone, resorcinol, diacetoxy resorcinol, p,p'-biphenol; p,p'-oxybiphenol and 4,4'-dihydroxy diphenyl sulfone. Hydroquinone is preferred because of cost, availability and reactivity.

According to a preferred process for producing the preferred heat resistant polyesters of the present invention p-hydroxybenzoic acid is reacted with an aromatic dicarbonyl compound of Formula VII in the presence of a monoester of Formula X:

(X)

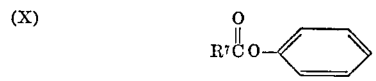

to produce a triester of Formula XI:

(XI)

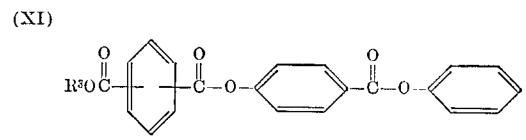

wherein $R^3$ has the above described meaning and $R^7$ is phenyl or preferably lower alkyl. This triester is then reacted with a dihydroxy benzene of Formula XII:

(XII)

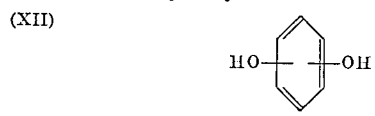

wherein the hydroxyl groups are meta or para to each other to produce a polyester with an average Formula XIII:

(XIII)

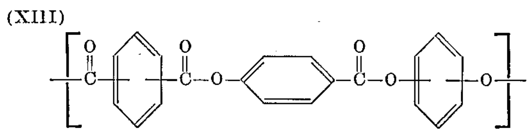

Examples of suitable compounds of Formula X include among others phenyl benzoate, phenyl propionate, and most preferably phenyl acetate.

The p-hydroxybenzoic acid can be mixed with the dicarbonyl compound of Formula VII and the monoester of Formula X at any temperature which will result in a reaction but generally at about 50 to 220° C. and preferably at about 160 to 200° C. At lower temperatures the reaction proceeds at an uneconomically slow rate whereas at higher temperatures the p-hydroxybenzoic acid tends to undergo an undesirable decarboxylation reaction. Superambient or subambient pressures can be employed but atmospheric pressure is preferred for convenience. Catalysts are not necessary under all reaction conditions but can be advantageously employed to increase the rate of reaction. The preferred catalysts are gaseous acid catalysts such as Lewis acids, but are preferably the hydrogen halides and especially HCl.

The condensation reaction of the triester with the dihydroxy benzene can be conducted at about 200 to 400° C. but preferably at about 250 to 350° C. At lower temperatures the reaction proceeds at an uneconomically slow rate whereas at higher temperatures the polyester tends to degrade. Higher molecular weight favors thermal stability and therefore the reaction temperature is preferably raised stepwise within the above ranges as molecular weight increases. Although the condensation reaction can be conducted without the use of any catalyst, it is sometimes preferable to carry out the condensation in the presence of a catalytic amount of a suitable condensation catalyst. Any of a number of known transesterification catalysts can be employed, examples of which include among others sodium alkoxides; titanium alkoxides such as tetra-n-butyl orthotitanate; sodium titanium alkoxides; lithium hydroxide; and p-toluenesulfonic acid.

The above described reactions can be conducted in the melt phase but are preferably conducted in the presence of a liquid heat transfer medium having a high boiling point. Examples of suitable heat transfer media include among others the terphenyls; a eutectic mixture of 73.5 percent diphenyl oxide and 26.5 percent diphenyl, commercially available under the trademark Dowtherm® A; mixtures of various polychlorinated polyphenyls such as chlorinated biphenyls typified by those commercially available under the trademark Therminol® FR; polyaromatic ethers and mixtures thereof such as those composed of mixtures of meta and para isomers, having boiling ranges in excess of 400° C., typical representatives of which are available commercially under the trademark Therminol® 77.

The term lower when used with terms such as lower alkyl and lower alkoxy refers to a content of one to six carbon atoms. The phenylene radicals are preferably unsubstituted but can have one to three substituents which do not materially alter the physical and chemical characteristics of these novel polyesters. Examples of suitable substituents include among others halogen such as chlorine, fluorine or bromine; lower alkyl such as methyl, ethyl or isopropyl; and lower alkoxy such as ethoxy.

The polyesters of the present invention have a wide range of utility and can be used to prepare fibers, films and coatings having excellent high temperature properties. They may be used as bonding agents for abrasive products and can be compression molded, employing conventional techniques, to produce articles having exceptionally high flexural modulus values. They are especially useful to provide substrates such as those of iron or steel with heat resistant protective coatings. The term, melting point, as used herein refers to that temperature at which the polyester changes from a solid to a viscous liquid. The term softening point refers to that temperature at which the polyester first transfers to a hot plate and is determined by placing the polyester in granular form on a hot steel plate and noting the lowest temperature at which some of the polyester transfers from the granules to the plate.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the synthesis of a novel polyester of the present invention termed Polyester A.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Phenyl acetate | 170 | 1.25 |
| C | Therminol® 77 | 500 | |
| D | Diphenyl terephthalate | 318 | 1 |
| E | Hydrogen chloride | | |
| F | Hydroquinone | 111 | 1.01 |
| G | Therminol® 77 | 500 | |

Items A–D are charged to a four-necked, round bottom flask fitted with a thermometer, a stirrer, a combined nitrogen and HCl inlet and an outlet connected to a condenser. Nitrogen is passed slowly through the inlet. The flask and its contents are heated to 180° C. whereupon HCl is bubbled through the reaction mixture. The outlet head temperature is kept at 110°–120° C. by external heating during the p-hydroxybenzoic acid phenyl acetate ester exchange reaction.

The flask and its contents are stirred at 180° C. for 6 hours whereupon the HCl is shut off, the outlet head temperature raised to 180–190° and the mixture stirred at 220° for 3.5 hours. Up to this point, 159 grams of distillate are collected in the condenser. The contents of the flask comprise Item C and a triester essentially of Formula XIV.

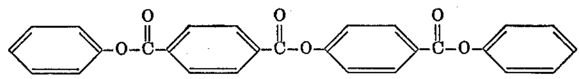

Item F is then added and the temperature gradually increased from 220° C. to 320° C. over a period of 10 hours (10° C./hr.). Stirring is continued at 320° C. for 16 hours and then for three additional hours at 340° C. to form a slurry. The total amount of distillate, consisting of phenol, acetic acid and phenyl acetate, amounts to 384 grams. Item G is added and the reaction mixture permitted to cool to 70° C. Acetone (750 ml.) is added and the slurry filtered, the solids are extracted in a Soxhlet with acetone to remove Items C and G. The solids are dried in vacuo at 110° C. overnight whereupon the resultant powder (320 grams, 89.2% of theory) is termed Polyester A.

Thermal properties: The observed softening point of Polyester A is 920° F. Differential thermal analysis (in air) shows a weak endotherm at 780° F. and a major endotherm at 950° F. An isothermal thermogravimetric analysis (in air) shows a weight loss of 5% after 3 hours at 752° F.

Fibers are obtained from this polyester. When the material is ram-extruded at 900° F. under some pressure a melt is produced from which fibrous material can be formed. The fibers show extraordinary thermal and dimensional stability even when heated in air as high as 880° F.

The copolyester fibers were examined by X-ray diffraction using nickel filtered copper radiation. A rotation camera was used and the fibers were rotated about the fiber axis. The resulting photographs showed a few lines (dots) along the equator (zero layer) and several dots on an upper layer. The layer spacing indicates a period along the fiber axis of about 19.5 A. and a dominant distance along the direction perpendicular to the fiber axis of about 4.5 A. The intensity of the 4.5 A. line is by far the strongest. The data suggest that the unit cell is either orthorhombic or tetragonal with one axis of approximately 19.5 A. and the other two axes of about 4.5 A. The 19.5 A. dimension is consistent with the structure of Formula XV:

(XV)

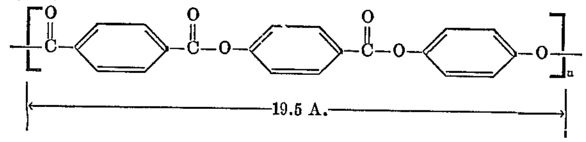

wherein $n$ is 10 to 70.

Polyester A can be homogenized on a two roll mill at 510° C. In this form it is possible to form fibers of extraordinary dimensioned stability in air up to 470° C. Several fibers were heated together in a heat zone in air carrying a load of 56 grams. They were exposed at above 343° C. for 6 hours, above 427° C. for 5 hours, above 441° C. for 1.5 hours and at 470° C. for 45 minutes. There was a 3% elongation at 400° C. which ceased. There was another 3% elongation at 441° C. which ceased indicating that the elongation may be due to orientation rather than amorphous properties.

A sample of Polyester A is compression molded into a test specimen at 900° F. and 4000 p.s.i. This test specimen has an average flexural strength of 6000 p.s.i., an average flexural modulus of $0.78 \times 10^6$ p.s.i. and an average strain of 1.34%.

EXAMPLE 2

This example illustrates the synthesis of a novel polyester of the present invention termed Polyester B.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Phenyl acetate | 170 | 1.25 |
| C | Therminol® 77 | 500 | |
| D | Diphenyl terephthalate | 159 | 0.50 |
| E | Hydrogen chloride | | |
| F | Hydroquinone | 55.5 | 0.505 |
| G | Therminol® 77 | 500 | |

By a similar procedure to that set forth in Example 1, 106 grams of distillate is collected before the addition of Item F and a total distillate of 312 grams is collected during the entire run. The yield of polymer is 230 grams (96% of theory) and is termed Polyester B.

Thermal properties: The observed softening point of Polyester B is 820° F. A differential thermal analysis shows weak endotherms at 716–770° F. and a major endotherm at 1000° F. An isothermal thermogravimetric analysis shows a weight loss in air of 11% after 3 hours at 752° F.

EXAMPLE 3

This example illustrates the synthesis of a novel polyester of the present invention termed Polyester C.

The following quantities of the following ingredients are combined as indicated.

| Item | Ingredient | Quantity | |
|---|---|---|---|
| | | Grams | Moles |
| A | p-Hydroxybenzoic acid | 276 | 2 |
| B | Phenyl acetate | 340 | 2.5 |
| C | Therminol® 77 | 500 | |
| D | Diphenyl terephthalate | 159 | 0.5 |
| E | Hydrogen chloride | | |
| F | Hydroquinone | 55.5 | 0.505 |
| G | Therminol® 77 | 500 | |

By a similar procedure to that set forth in Example 1, 204 grams of distillate is collected before the addition of Item F and a total distillate of 363 grams is collected for the entire run. The yield of polymer powder is 315 grams (87.5% of theory) and is termed Polyester C.

Thermal properties: The observed softening point of the powder is 810° F. A differential thermal analysis shows a weak endotherm at 707° F., a medium endotherm at 770° F. and a major endotherm at 970° F. An isothermal thermogravimetric analysis shows a weight loss in air of 5.5% after 3 hours at 752° F.

EXAMPLE 4

This example illustrates the synthesis of a novel polyester of the present invention termed Polyester D.

The following quantities of the following ingredients are combined as indicated.

| Item | Ingredient | Quantity | |
|---|---|---|---|
| | | Grams | Moles |
| A | p-Hydroxybenzoic acid | 373 | 2.7 |
| B | Phenyl acetate | 460 | 3.38 |
| C | Therminol® 77 | 500 | |
| D | Diphenyl terephthalate | 47.7 | 0.15 |
| E | Hydrogen chloride | | |
| F | Hydroquinone | 16.7 | 0.152 |
| G | Therminol® 77 | 500 | |

By a similar procedure to that set forth in Example 1, 185 grams of distillate is collected before the addition of Item F and a total distillate of 539 grams is collected for the run. The yield is 330 grams (91.7% of theory) of Polyester D.

Thermal properties: The observed softening point of the powder is 890° F. A differential thermal analysis shows minor endotherms at 544° F. to 711° F., a moderate endotherm at 914° F. an a major endotherm at 981° F. An isothermal thermogravimetric analysis shows a weight loss of 16% after 3 hours of exposure in air at 752° F.

EXAMPLE 5

This example illustrates the synthesis of a novel polyester of the present invention termed Polyester E of Formula XVI.

(XVI)

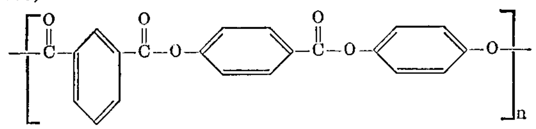

wherein $n$ is 10 to 70.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Diphenyl isophthalate | 318 | 1 |
| C | Phenyl acetate | 170 | 1.25 |
| D | Hydrogen chloride | | |
| E | Therminol® 77 | 500 | |
| F | Hydroquinone | 111.1 | 1.01 |
| G | Therminol® 77 | 500 | |

Items A–C are charged to a four-necked flask, equipped as described in Example 1. Nitrogen is slowly passed through the inlet. The flask and its contents are heated to 180° C. whereupon HCl is bubbled through the reaction mixture. The outlet head temperature is maintained at 110°–120° C. during the acid-ester exchange period. The reaction mixture is stirred at 180° C. for 3 hours whereby 128 grams of distillate is collected. After increasing the temperature to 200° C. and stirring the reaction mixture for 1½ hours at this temperature, Item E is added. The reaction mixture is then stirred for 1½ hours at 220° C., the HCl shut off and the outlet head temperature increased to 180°–190° C. An additional 12 grams of distillate is collected in the receiver at this point. Item F is introduced and the temperature increased to 270° C. The reaction mixture is stirred at 270° C. for 3 hours, whereby 75 grams of distillate is collected. The mixture is then heated from 270°–300° C. at a rate of 10° C./hr. and stirred at 300° C. for 1½ hours. After stirring the mixture for 1 hour at 310° C., Item G is added and the mixture is stirred for 16 hours at 320° C. Finally, the mixture is stirred for 3 hours at 340° C. A total distillate of 362 grams is collected during the run. After cooling to 150° C., the reaction mixture is poured slowly, with vigorous stirring, into about 3 liters of n-heptane and the mixture allowed to stand at room temperature overnight. The solid material is collected by filtration, placed in a Soxhlet cup and extracted with n-heptane overnight to remove solvents. Upon drying the material overnight at 110°, in vacuo, 334 grams (92.8% of theory) of polymer is obtained which is termed Polyester E.

Thermal properties: The polymer forms a clear melt at 700° F. Fibers can be drawn at temperatures above 650° F.

EXAMPLE 6

This example illustrates the synthesis of a novel polyester of the present invention termed Polyester F.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Phenyl acetate | 170 | 1.25 |
| C | Diphenyl isophthalate | 159 | 0.50 |
| D | Hydrogen chloride | | |
| E | Hydroquinone | 55 | 0.50 |
| F | Therminol® 77 | 277 | |

Items A–C are heated to 180° C. and HCl bubbled through the mixture. The mixture is stirred at 180° C. for 6 hours whereby 50 grams of distillate is collected. After stirring the mixture for 2 hours at 200° C. an additional 17 grams of distillate is collected. At this point, the HCl flow is turned off and Item E introduced. Polymerization is accomplished by stirring the mixture at 280° C. for 1 hour, at 300°–310° C. for 2 hours, Item F is added and the stirring is carried out for 5 hours at 320° C. After cooling, the mixture is triturated with acetone and the solids collected by filtration. The solids are then placed in a Soxhlet cup and extracted continuously overnight with acetone. After drying the solid at 110° C. in vacuum, 191 grams (80% of theory) of polymer powder is obtained and is termed Polyester F.

Thermal properties: The observed softening point of the powder is 492° F. at which temperature it melts. A differential thermal analysis shows three endotherms at 400° F., 446° F. and 482° F.

EXAMPLE 7

This example illustrates the synthesis of a novel polyester of the present invention termed Polyester G.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Phenyl acetate | 170 | 1.25 |
| C | Diphenyl isophthalate | 39.75 | 0.125 |
| D | Hydrogen chloride | | |
| E | Hydroquinone | 15.75 | 0.133 |
| F | Therminol ® 77 | 500 | |

By a similar procedure to that set forth in Example 6, 80 grams of distillate is obtained before the simultaneous addition of Items E and F. A total distillate of 225 grams is collected for the entire run. The yield of polymer is 135 grams (90% of theory) and is termed Polyester G.

Thermal properties: The observed softening point of the powder is 630° F. A differential thermal analysis shows a broad endotherm at 690°–755° F.

EXAMPLE 8

This example illustrates the synthesis of a novel polyester of the present invention termed Polyester H.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Phenyl acetate | 170 | 1.25 |
| C | Diphenyl terephthalate | 318 | 1 |
| D | Therminol ® 77 | 500 | |
| E | Hydrogen chloride | | |
| F | Resorcinol | 111 | 1.01 |
| G | Therminol ® 77 | 500 | |

Items A–D are charged to a four-necked resin kettle, equipped as stated in Example 1. The charge is stirred at 180° C. for 7 hours, while hydrogen chloride is bubbled through the mixture. At this time 64.5 grams of distillate was collected in the receiver. The HCl flow is discontinued and the mixture stirred at 220° C. for 1 hour. At this point, Item F is introduced and the temperature of the reaction mixture brought from 230° to 290° C. at a rate of 10° C./hr. During this period 182 grams of distillate is collected. The reaction mixture is then stirred for 2 hours at 300° C., 1½ hours at 310° C., 16 hours at 320° C. and 7 hours at 340° C. The total distilled for the entire run is 353.5 grams. Item G is introduced and the mixture allowed to cool to 150° C. At this point the mixture is poured slowly, with stirring (caution), into 3 liters of acetone. Since the mixture is slightly soluble in the acetone-Therminol® 77 mixture, 3 liters of petroleum ether (B.P. 30°–60° C.) is added to aid in solidification of the product. The solids are collected by filtration, pulverized in a mixer-blender and then extracted with hexane in a Soxhlet extractor. The product is vacuum dried at 110° C. for 1 hour to yield 312 grams (86.7% of theory) of polymer termed Polyester H.

EXAMPLE 9

This example illustrates the synthesis of a novel polyester of the present invention termed Polyester I.

The following quantities of the following ingredients are combined as indicated.

| Item | Ingredient | Quantity | |
|---|---|---|---|
| | | Grams | Moles |
| A | p-Hydroxybenzoic acid | 69 | 0.5 |
| B | Phenyl acetate | 85 | 0.625 |
| C | Therminol ® 77 | 250 | |
| D | Diphenyl terephthalate | 159 | 0.5 |
| E | Hydrogen chloride | | |
| F | p,p′-Biphenol | 93 | 0.5 |
| G | Therminol ® 77 | 250 | |

Items A–C are charged to a one liter four-necked resin kettle and the polymer is prepared by a procedure similar to that set forth in Example 1. The total distillate collected in this run is 193 grams and the yield of the lightly colored polymer, termed Polyeser I, is quantitative.

Thermal properties: The softening point of this material is above 800° F. A differential thermal analysis shows a broad endotherm at 790° F. An isothermal thermogravimetric analysis in air at 752° F. shows a weight loss of 5% after 2 hours.

EXAMPLE 10

This example illustrates the synthesis of a novel polyester of the present invention termed Polyester J.

The following quantities of the following ingredients are combined as indicated.

| Item | Ingredient | Quantity | |
|---|---|---|---|
| | | Grams | Moles |
| A | p-Hydroxybenzoic acid | 138 | 1 |
| B | Phenyl acetate | 170 | 1.25 |
| C | Diphenyl terephthalate | 159 | 0.50 |
| D | Diphenyl isophthalate | 159 | 0.50 |
| E | Hydrogen chloride | | |
| F | Therminol ® 77 | 500 | |
| G | Hydroquinone | 111.1 | 1.01 |
| H | Therminol ® 77 | 500 | |

The apparatus is similar to that set forth in Example 1. Items A–D are charged and nitrogen passed slowly through the inlet. The charge is heated to 180° C. and HCl bubbled through the mixture while the temperature of the outlet head is maintained at 110°–120° C. After stirring the mixture at 180° C. for 7 hours, the HCl is shut off, 70 grams of distillate collected and the temperature of the mixture is increased to 200° C. Item F. is introduced and after 1 hour of stirring at 220° C., Item G is added. The temperature is increased to 320° C. at a rate of 10° C./hr. After stirring the mixture for 16 hours at 320° C. and for 3 hours at 340° C., 299 grams of distillate is collected. The product is worked up by a procedure similar to that set forth in Example 1. The yield was 306 grams (87% of theory) of polymer powder which is termed Polyester J.

Thermal properties: Although this material has a lower softening point than Polyester A (see Example 1), the range is considerably larger. Also, the weight loss in air at 752° F. is greater than that of Polyester A.

EXAMPLE 11

This example illustrates the acetate-route synthesis of a novel polyester of the present invention termed Polyester K.

The following quantities of the following ingredients are combined as indicated.

| Item | Ingredient | Quantity | |
|---|---|---|---|
| | | Grams | Molse |
| A | p-Hydroxybenzoic acid | 138 | 1 |
| B | Hydroquinone | 110 | 1 |
| C | Acetic anhydride | 357 | 3.5 |
| D | Therminol® 77 | 500 | |
| E | Terephthalic acid | 166 | 1 |
| F | Therminol® 77 | 500 | |

Items A–D are charged to a 2 liter four-necked resin kettle provided with a $N_2$ inlet, stirrer, a distilling head and a thermometer. No nitrogen is passed through the system in the initial stage of the reaction. The charge is heated at 150° C. for 4½ hours keeping the distilling head at about 125° C. so only acetic acid is removed. The mixture is then stirred at 160° C. for 3¼ hours, a total of 1.28 grams of acetic acid is collected up to this point. Items E and F are introduced and a slight nitrogen stream is passed over the reaction mixture. The stirred reaction mixture is taken from 180° C. to 210° C. at a rate of 10° C./hr. Then the mixture is stirred at 210° C. for 1½ hours, 230° C. for 1 hour, 250° C. for 2 hours, 270° C. for 3 hours, 280° C. for 1 hour, 290° for 1 hour, 300° C. for 2 hours, 310° C. for 1 hour, 320° C. for 16 hours and finally 340° C. for 3 hours. A total of 414 grams of distillate, mainly acetic acid, is collected for the entire run. After allowing the mixture to cool to 80° C., the mixture is poured into a 4 liter container and 2 liters of acetone introduced. The solids are collected by filtration and then extracted with acetone in a Soxhlet extractor. After drying at 110° C. in vacuum, 345 grams (96% of theory) of polymer termed Polyester K is obtained.

Thermal properties: Differential thermal analysis shows an endotherm at 232° C.

EXAMPLE 12

This example illustrates the acetate-route synthesis of a novel polyester termed Polyester L.

The following quantities of the following ingredients are combined as indicated.

| Item | Ingredient | Quantity Grams | Moles |
|---|---|---|---|
| A | p-Acetoxybenzoic acid | 180 | 1 |
| B | Isophthalic acid | 166 | 1 |
| C | p-Phenylene diacetate | 194 | 1 |
| D | Therminol® 77 | 1,000 | |

Items A–D are charged to a 2 liter four-necked resin kettle equipped with stirrer, a thermometer, distilling head and nitrogen inlet. Keeping the ingredients under a nitrogen atmosphere, the kettle and its contents are stirred at 210° C. for 2 hours, 230° C. for 1 hour, 250° C. for 3 hours, 270° C. for 2 hours, 290° C. for 1 hour, 310° C. for 1 hour, 16 hours at 320° C. and finally at 340° C. for 3 hours. A total of 244 grams of distillate is collected for the entire run. The product is isolated in the same manner described in Example 11. The yield is 332 grams (92.2% of theory) of polymer termed Polyester L.

EXAMPLE 13

This example illustrates the acetate-route synthesis of a novel polyester of the present invention termed Polyester M.

The following quantities of the following ingredients are combined as indicated.

| Item | Ingredient | Quantity Grams | Moles |
|---|---|---|---|
| A | p-Hydroxybenzoic acid | 138 | 1 |
| B | Terephthalic acid | 166 | 1 |
| C | Resorcinol | 110 | 1 |
| D | Acetic anhydride | 357 | 3.5 |
| E | Therminol® 77 | 1,000 | |

The apparatus is the same as that described in Example 11. The charged is stirred at: 150° C. for 20 hours, 170° C. for 4 hours, 180° C. for 1 hour, 190° C. for 1 hour, 200° C. for 1 hour, 210° C. for 3 hours, 230° C. for 1 hour, 240° C. for 1 hour, 250° C. for 2 hours, 270° C. for 1 hour, 280° C. for 1 hour, 290° C. for 1 hour, 300° C. for 45 minutes, 320° C. for 16 hours and finally 340° C. for 3 hours. The solid is isolated in the same manner set forth in Example 11. A yield of 300 grams (83.3% of theory) of polymer is obtained and termed Polyester M.

The results of the foregoing examples are summarized in the following table wherein the example number is given in column 1 and the designation of the polyester in column 2. The components of the polyester are given in column 3 wherein:

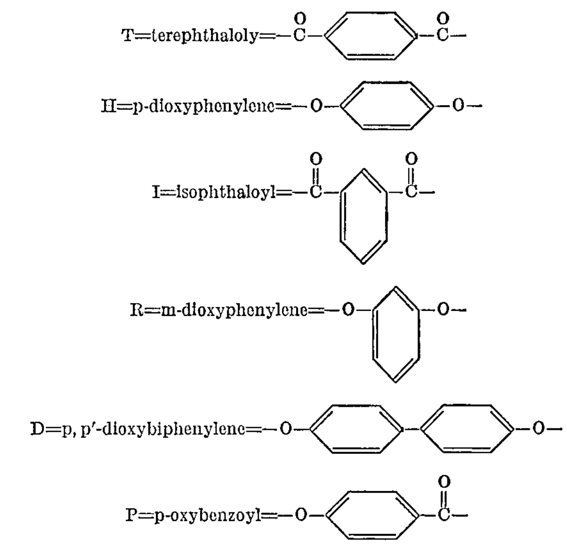

The molar ratios of the components in column 3 are given in column 4 in the same order. The route of synthesis is given in column 5 where PE stands for the phenyl ester route wherein the p-oxybenzoyl moiety is introduced by the preformation of the phenyl ester of p-hydroxybenzoic acid and A stands for the acetate route wherein the p-oxybenzoyl moiety is introduced by the preformation of p-acetoxybenzoic acid. The mole percent of p-oxybenzoyl moiety is shown in column 6 calculated from the values in column 4. The softening point is recorded in column 7.

| Example | Polyester | Components | Mole ratio of components | Route | Amount of P (mole percent) | Softening or melting point (° F.) |
|---|---|---|---|---|---|---|
| 1 | A | T:P:H | 1:1:1 | PE | 33⅓ | [1] 920 |
| 2 | B | T:P:H | 1:2:1 | PE | 50 | [1] 820 |
| 3 | C | T:P:H | 1:4:1 | PE | 66⅔ | [1] 810 |
| 4 | D | T:P:H | 1:18:1 | PE | 90 | [1] 890 |
| 5 | E | I:P:H | 1:1:1 | PE | 33⅓ | [2] 700 |
| 6 | F | I:P:H | 1:2:1 | PE | 50 | [2] 492 |
| 7 | G | I:P:H | 1:8:1 | PE | 80 | [2] 630 |
| 8 | H | T:P:R | 1:1:1 | PE | 33⅓ | |
| 9 | I | T:P:D | 1:1:1 | PE | 33⅓ | [1] 800 |
| 10 | J | T:I:P:H | 1:1:2:2 | PE | 33⅓ | |
| 11 | K | T:P:H | 1:1:1 | A | 33⅓ | |
| 12 | L | I:P:H | 1:1:1 | A | 33⅓ | |
| 13 | M | T:P:R | 1:1:1 | A | 33⅓ | |

[1] Softening point.
[2] Melting point.

The softening points of Polyesters A through D and the melting points of Polyesters E through G are illustrated graphically in the single figure of the drawing which clearly shows that the copolyesters of the present invention exhibit softening or melting points less than homopolyesters of the p-oxybenzoyl moiety of the reaction product of e.g., terephthalic acid and hydroquinone.

What is claimed is:

1. A moldable, film-forming or coating-forming polyester having a molecular weight in the range from 3,500 to 72,000 and a melting or softening point of at least 492° F., consisting essentially of recurring moieties of Formulae I, II and III:

(I)

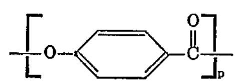

(II)

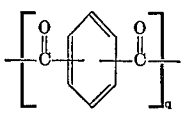

(III)

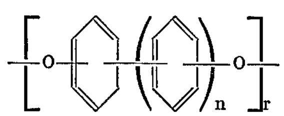

wherein $n$ is 0 or 1; $q:r=10:15$ to $15:10$; $p:q=1:100$ to $100:1$; $p+q+r=30$ to 600; the carbonyl group of the moiety of Formula I or II is linked to the oxy group of a moiety of Formula I or III; the oxy group of the moiety of Formula I or III is linked to the carbonyl group of the moiety of Formula I or II; the carbonyl groups of the moiety of Formula II are meta or para to each other; and the oxy groups of the moiety of Formula III are meta or para to each other.

2. The polyester of claim 1 wherein the carbonyl groups of the moiety of Formula II are para to each other.

3. The polyester of claim 1 wherein the oxy groups of the moiety of Formula III are para to each other.

4. The polyester of claim 2 wherein the oxy groups of the moiety of Formula III are para to each other.

5. The polyester of claim 1 wherein both m-phenylene radicals and p-phenylene radicals are present and the ratio of m-phenylene radicals to p-phenylene radicals is greater than 1:10.

6. The polyester of claim 1 wherein $q:r$ is 10:11 to 11:10.

7. The polyester of claim 1 wherein $p:q$ is 10:100 to 100:10.

8. The polyester of claim 1 wherein $p+q+r$ is 30 to 200, said polyester having a molecular weight in the range from 3500 to 25,000.

9. A moldable, film-forming or coating-forming polyester having a molecular weight in the range from 3500 to 25,000 and a softening point of at least 810° F., consisting essentially of recurring moieties of Formulae I, IV and V:

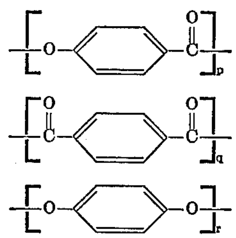

wherein $q:r$ is 10:11 to 11:10; $p:q$ is 10:100 to 100:10; $p+q+r$ is 30 to 200; the carbonyl group of the moiety of Formula I or IV is linked to the oxy group of a moiety of Formula I or V; and the oxy group of the moiety of Formula I or V is linked to the carbonyl group of the moiety of Formula I or IV.

10. A fiber of the polyester of claim 9.

11. The polyester of claim 9 of the formula:

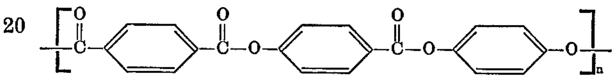

wherein $n$ is an integer from 10 to 70.

12. The polyester of claim 1 of the formula:

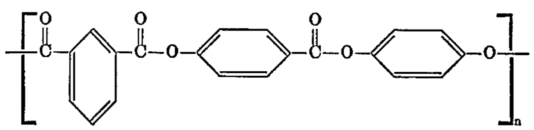

wherein $n$ is an integer from 10 to 70.

13. The polyester of claim 1 wherein $n$ is 0.

References Cited

UNITED STATES PATENTS

| | | | |
|---|---|---|---|
| 3,033,822 | 5/1962 | Kibler et al. | 260—47 C |

FOREIGN PATENTS

| | | | |
|---|---|---|---|
| 648,513 | 1/1951 | Great Britain | 260—47 C |
| 933,448 | 8/1963 | Great Britain | 260—47 C |
| 958,798 | 5/1964 | Great Britain | 260—47 C |

WILLIAM H. SHORT, Primary Examiner

L. P. QUAST, Assistant Examiner

U.S. Cl. X.R.

117—132 C; 260—49

PO-1050
(5/69)

UNITED STATES PATENT OFFICE
CERTIFICATE OF CORRECTION

Patent No. 3,637,595 Dated January 25, 1972

Inventor(s) S. G. Cottis et al

It is certified that error appears in the above-identified patent and that said Letters Patent are hereby corrected as shown below:

At page 1, Column 1, line 6, following "caster, N. Y., 14086" should read ---assignors to The Carborundum Company, Niagara Falls, N. Y.---

Signed and sealed this 27th day of November 1973.

(SEAL)
Attest:

EDWARD M.FLETCHER,JR.
Attesting Officer

RENE D. TEGTMEYER
Acting Commissioner of Patents